Dec. 14, 1965     J. V. HUTELMYER     3,223,118
AIR BRAKE TANKS
Filed Aug. 30, 1963     2 Sheets-Sheet 1
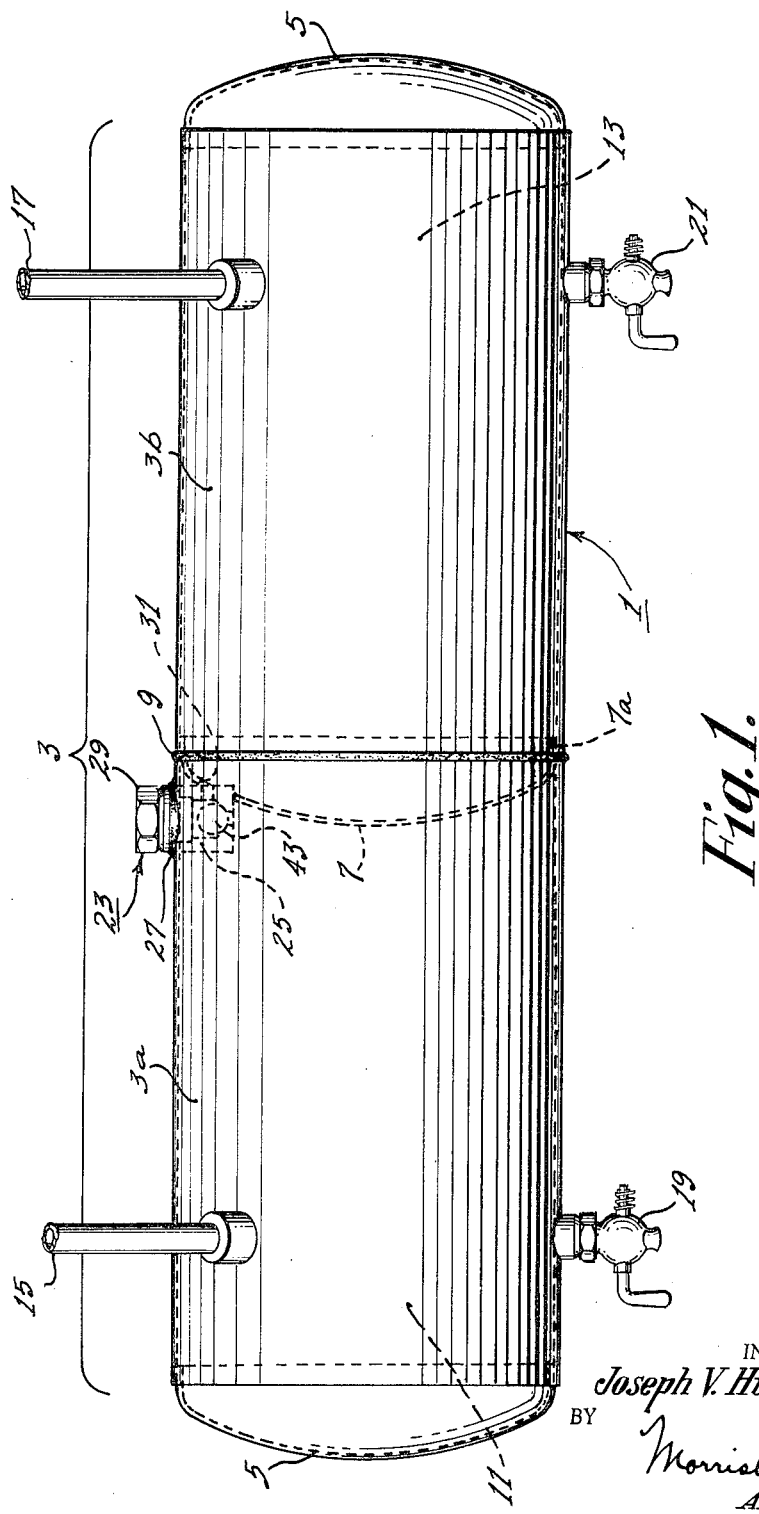
INVENTOR.
Joseph V. Hutelmyer
BY
Morris B. Rabkin
ATTORNEY.

Dec. 14, 1965  J. V. HUTELMYER  3,223,118
AIR BRAKE TANKS
Filed Aug. 30, 1963  2 Sheets-Sheet 2
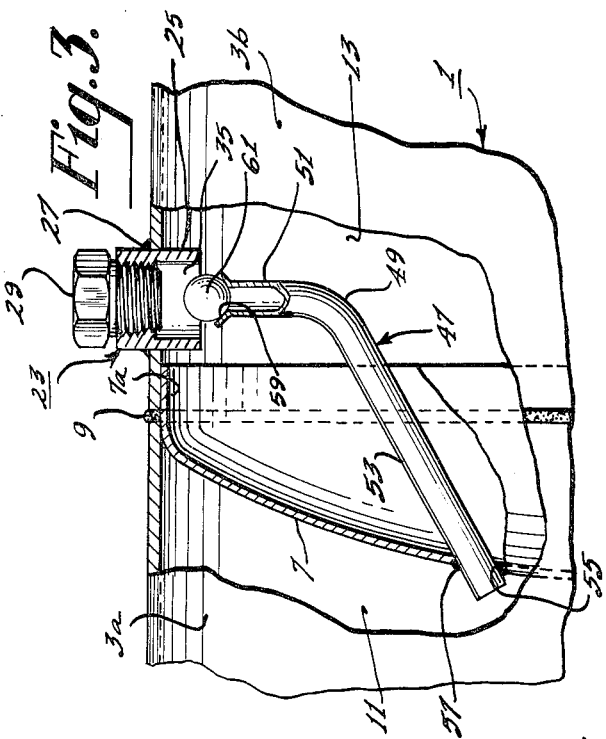
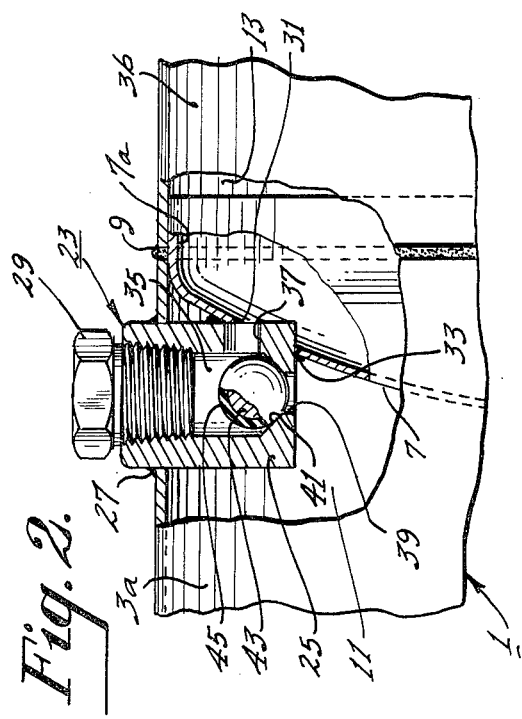
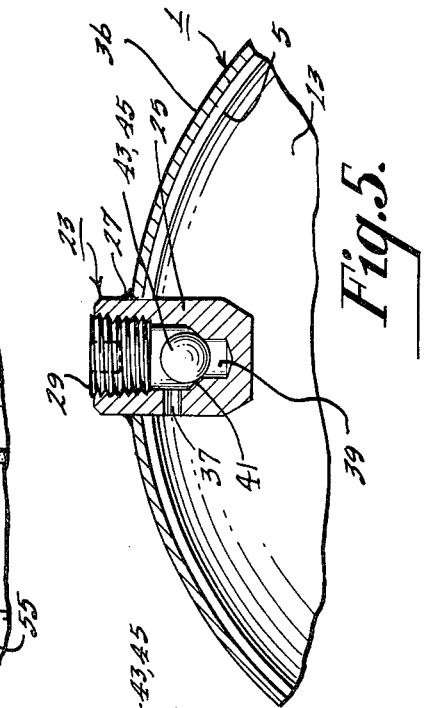
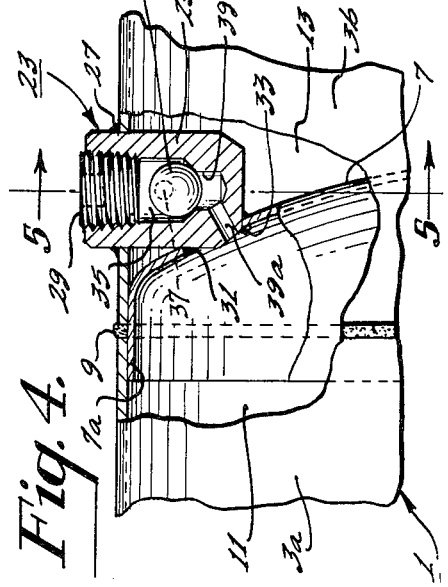
INVENTOR.
Joseph V. Hutelmyer
BY
ATTORNEY.

United States Patent Office 3,223,118
Patented Dec. 14, 1965

3,223,118
AIR BRAKE TANKS
Joseph V. Hutelmyer, Meadowbrook, Pa., assignor to Cutler Meat Products Company, Camden, N.J., a corporation of New Jersey
Filed Aug. 30, 1963, Ser. No. 305,620
12 Claims. (Cl. 137—572)

This invention relates to air brake tanks, and more particularly to compressed air tanks for use on motor vehicles, such as trucks for operating the brakes thereof.

Many trucks presently in operation use air pressure to actuate the brakes. The compressed air, which comes from the engine's compressor and is stored in a tank in readiness for use as needed, is warm when it leaves the compressor and contains moisture. Conventional air brake tanks are made with two compartments or chambers. The air is admitted into one (the "wet") compartment, where the moisture condenses, so that it can be blown off at intervals. Periodically, the compressed air, after removal of moisture therefrom, is transferred to the other (the "dry") compartment where it is stored in readiness to be applied to the brakes when needed.

In service, the compressed air is transferred from the wet compartment to the dry compartment through piping on the outside of the tank shell. This piping includes a check valve the purpose of which is to provide a safety device in the event that air is lost from the wet compartment. In such event, the check valve goes into action to retain the air in the dry compartment so that the usefulness of the brakes will not be impaired despite the partial loss of air pressure.

Tanks with piping as described above have certain serious disadvantages. In the first place, such piping, and especially the check valves, being on the outside of the tanks, are easily subject to damage. It is not infrequent, for example, for the valves to be struck by flying stones accidentally propelled thereagainst by the wheels of passing vehicles; and occasionally, the check valve may even be dislodged from the tank. In such case, there is nothing to restrain the braking air from being exhausted, and the brakes cannot be operated. Another disadvantage of check valves customarily used is that moisture can collect in them upon being condensed. In winter, this moisture freezes and often prevents the valve from opening. This, of course, cuts off from the dry compartment the source of air pressure in the wet compartment and gradually renders the brakes inoperable. A third disadvantage is also found in valves customarily used with air brake tanks. Occasionally, solid foreign matter may find its way into these valves and become trapped between the valve proper and its seat, so that the valve cannot close properly against the seat. There is thus created a continuing opening between the valve and the seat which permits more or less free flow of air (and moisture, to some degree) from the wet compartment to the dry compartment.

The primary object of the present invention is to provide an improved air brake tank structure for use with trucks and other vehicles having brakes operated by compressed air, which tank structure will be free from the aforementioned and other disadvantages characteristic of known compressed air brake tanks.

More particularly, it is an object of the present invention to provide an improved compressed air tank structure for use with brakes on vehicles and in which the check valve is so constructed and arranged that it will not be subject to the disadvantages previously set forth.

Another object of the present invention is to provide an improved compressed air tank structure of the type set forth wherein the check valve is so disposed as to be well protected and practically free from accidental damage by projectiles or the like.

Still another object of this invention is to provide an improved tank structure as aforesaid wherein the check valve is of small, compact design and can be built into the tank in such manner as to be not only well protected, but easily accessible from the exterior of the tank for replacement or servicing, as may be necessary on occasion.

A further object of this invention is to provide an improved compressed air tank structure for the purpose set forth which does not require external piping.

It is also an object of the present invention to provide an improved compressed air tank structure which is especially suitable for use with vehicle brakes, which is neat in appearance and compact in structure, which is inexpensive to manufacture, and which is highly efficient in use.

Briefly, stated, in one form of tank structure according to this invention, the tank may comprise a single, closed shell having a partition or wall therein which divides the interior of the tank into the wet and dry compartments or sections. The external piping is entirely dispensed with, and use is made of a small, compact, ball type check valve which is mounted on the tank in a position to communicate with both compartments in the vicinity of the aforesaid partition. When air is required in the dry compartment, the ball is blown off its seat by the air pressure in the wet compartment to permit the compressed air in the wet compartment to pass freely into the dry compartment. In the event of any reduction of the air pressure in the wet compartment, the ball immediately seats itself in response to air pressure in the dry compartment and automatically locks the air in the dry compartment. The ball is preferably rubber covered so that, notwithstanding any small particles of foreign matter that may lodge on the valve seat, the ball can still seat firmly thereagainst. The valve is provided with a port or duct leading to the wet compartment so that moisture tending to accumulate therein will readily flow back into the wet compartment. Since the valve is disposed within the tank and can therefore be exposed to the warm air coming from the compressor, any moisture which may accumulate in the valve and, perhaps, freeze at times will readily be melted when it is subjected to the warm air.

The novel features of the invention, both as to its organization and method of operation, as well as additional objects and advantages thereof, will be understood more readily from the following description, when read in connection with the accompanying drawings in which:

FIGURE 1 is a side elevation of one form of tank structure according to the present invention, FIGURE 2 is a fragmentary, sectional view showing a portion of the interior of the tank and also one form of check valve disposed on the tank in accordance with this invention, FIGURES 3 and 4 are views similar to FIGURE 2 but showing different forms of valve structures and other locations therefor on the tank, and FIGURE 5 is a fragmentary, sectional view taken on the line 5—5 of FIGURE 4 and viewed in the direction of the appended arrows.

Referring more particularly to the drawings, there is shown, in FIG. 1, a tank 1 of steel, aluminum or the like having a longitudinal cylindrical wall or shell 3 closed by opposed end walls 5, all welded together into an air tight, integral, structural unit. The shell 3 may be comprised of a single, tubular member or, as illustrated in FIG. 1, of a pair of tubular members 3a and 3b butt welded together at their proximate ends. Within the shell 3, approximately midway of its length, is a partition 7 which is also welded to the shell 3 in air tight, integral relation therewith. For this purpose, the partition 7 may be formed with a cylindrical flange 7a over which the proximate ends of the tubular shell members 3a are fitted frictionally, and the assembly can then be welded together circumferentially therearound by a suitable weld joint 9 into an integral unit.

The partition 7 divides the tank into two compartments or sections 11 and 13. The shell section 3a is provided with an inlet pipe 15 through which compressed air, usually moisture laden, is supplied to the compartment 11, commonly referred to as the wet compartment, from a suitable compressor (not shown). The shell section 3b is provided with an outlet pipe 17 through which compressed air stored in the compartment 13, usually referred to as the dry compartment, is supplied to utilization means, such as the brakes of a truck or other vehicle. The shell section 3a is also provided with a drain 19 through which moisture which may have condensed and collected in the compartment 11 can be drawn off as needed; and the shell section 3b can also be provided with a similar drain 21 if desired.

Mounted on one or the other of the shell sections 3a and 3b is a check valve 23 for controlling the passage of compressed air in a forward direction from the compartment 11 to the compartment 13 for storage in the latter to be used as needed. In the form of the invention shown in FIGS. 1 and 2, the check valve is mounted on the cylindrical wall of the shell section 3a, while in the forms shown in FIGS. 3 and 4, the check valve is mounted on the cylindrical wall of the shell section 3b. In either case, the check valve comprises a tubular body 25 which extends through the appropriate shell section wall and is welded thereto, as by a weld joint 27, in air tight relation therewith. At its outer end, the body 25 is internally threaded for reception of a threaded closure plug 29 to keep it air tight from the ambient. It will be noted that only a very short length of the body 25 and the plug 29 extends outside of the shell. Thus, the danger of damage thereto by a stone or other missile propelled thereagainst is very greatly minimized, and especially so since there are no pipe connections to the check valve externally of the tank 1.

In the form shown in FIGS. 1 and 2, the body 25 of the check valve extends into the compartment 11 in proximity to the partition 7 and partly through an opening 31 in the partition, the body 25 being welded to the partition in air tight relation thereto around the opening 31, as by a weld 33. The valve body 25 has a chamber 35 therein from which two ports 37 and 39 extend. The port 37 is a radial port through the body 25 and opens into the compartment 13. The port 39 is an axial port which opens downwardly into the compartment 11 and which has a ball seat 41 at its upper end. Within the chamber 35 is a pressure responsive steel ball 43 which can be made to seat against the ball seat 41 or can be raised therefrom, depending upon the direction of forces applied thereto by the compressed air in the respective compartments 11 and 13. Preferably, the ball 43 is encased in a sheath 45 of compressible material, such as rubber, for a purpose presently to be indicated.

When compressed, moist air from the compressor is fed through the pipe 15 into the compartment 11, the air pressure therein increases to a point above that in the compartment 13. The excess air pressure in the compartment 11 over that in the compartment 13 raises the ball 43 from its seat 41. Compressed air can then flow freely from the compartment 11, through the port 39, the chamber 35, and the port 37 into the chamber 13 where it is stored for use. As the air in the compartment 13 is used up, more air flows thereinto from the compartment 11. Should the air pressure in the compartment 11 fall below that in the compartment 13, the excess air pressure in the compartment 13 over that in the compartment 11 forces the ball 43 firmly back against its seat 41 to thereby block return of compressed air in the chamber 13 to the chamber 11. If, perchance, small particles of foreign matter should accumulate on the valve seat 41, the ball 43 will nevertheless still seat firmly against its seat 41 by reason of the compressibility and resilience of the sheath 45 therearound.

The compressed air supplied to the compartment 11 is relatively warm and, as stated, usually contains moisture. On coming in contact with the relatively cold shell 3a and other parts of the compartment 11, this moisture condenses and falls to the bottom of the tank section 3a where it can be drained off at suitable intervals through the drain 19. If any moisture should condense and accumulate in the valve body chamber 35, it will drain off into the compartment 11 when the ball 43 is unseated. If, as sometimes may happen in extremely cold winter weather, condensed moisture in the chamber 35 or in the port 39 should freeze, the warm air from the compressor, upon striking the valve body, will melt the ice so that it can flow down into the compartment 11, so that the danger of ice blocking the valve is practically nil. This is not possible with prior art tanks which have check valves mounted externally of the tanks.

In FIGS. 4 and 5, the check valve 23 is similar to that of FIGS. 1 and 2. However, here the valve body 25 extends into the compartment 13 in proximity to the partition 7 and partly through the opening 31 in the partition. Here, again, communication between the compartment 13 and the valve chamber 35 is provided by the radial port 37. However, in this form of the invention, the lower or inner end of the valve body 25 is closed, and the port 39 has a laterally, downwardly inclined portion 39a (in a direction from the compartment 13 to the compartment 11) which opens into the chamber 11 and thus provides communication between the chamber 35 and the compartment 11. The operation of this form of the invention is similar to that described above in connection with FIGS. 1 and 2.

In the form shown in FIG. 3, the check valve body 25 again is mounted on the shell section 3b, as in FIG. 4, and extends into the compartment 13. However, here the body 25 is entirely open at the bottom or inner end for communication of the chamber 35 with the compartment 13. A tubular member 47 having a bend 49 to provide a vertical portion 51 and a downwardly inclined portion 53 in a direction from the compartment 13 to the compartment 11 is disposed in the compartment 13 and extends through an opening 55 in the partition 7 around which it is welded to the partition by an air tight weld joint 57. The upper end of the vertical portion 51 terminates in a ball seat 59 in proximity to the valve chamber 35 for cooperation with a rubber sheathed ball 61. This ball 61 is at all times at least partially within the valve chamber 35 so that it is always confined against falling to the bottom of the compartment 13. Excess air pressure in the compartment 11 forces the ball 61 off its seat 59 into the chamber 35 to permit air to flow from the compartment 11, through the tubular member 47, and into the compartment 13. On the other hand, excess air pressure in the compartment 13 forces the ball back down onto its seat 59 to thereby block return of compressed air from the compartment 13 to the compartment 11. Any moisture which may condense in the tubular member 47 will, of course, flow down along the inclined portion 53 thereof into the compartment 11 from which it can be drained off. Should any moisture condense in the compartment 13, it can be drained off through the drain 21.

From the foregoing description, it will be apparent that there have been provided improved compressed air tank structures which are devoid of external piping, which are compact in design, and in which the danger of damage to the check valves from external sources is practically nonexistent by reason of the fact that the valve, in each case, is housed almost entirely within the tank. Furthermore, the danger of the valve becoming frozen in cold weather is also practically eliminated. Should the valve become defective and need servicing at any time, this can be accomplished easily by merely removing the plug 29 or, if necessary, by removing the various weld joints to permit facile removal of the entire valve.

Although several forms of the invention have been described herein, it will undoubtedly be apparent to those skilled in the art that other forms thereof, as well as variations in those described, all coming within the spirit of this invention, are possible. Hence, it is desired that the foregoing shall be taken merely as illustrative and not in a limiting sense.

I claim:

1. A compressed air tank structure comprising an air tight tank having a shell, a partition in said tank in air tight relation with said shell dividing said tank into two compartments, a valve having a body mounted in part on said shell in air tight relation therewith and in part on said partition and extending into one of said compartments, said valve body having a chamber therein and a pair of ports in communication with said chamber, a first of said ports opening into a first of said compartments and the other of said ports opening into the other of said compartments through said partition whereby to establish communication between said compartments through said chamber, one of said ports having a valve seat, and a pressure responsive valve member in said chamber for cooperation with said seat, said valve member being displaceable from said seat to establish said communication between said compartments and being seatable against said seat to cut off said communication between said compartments.

2. A compressed air tank structure comprising an air tight tank having a shell, a partition in said tank in air tight relation with said shell dividing said tank into two compartments, a valve having a body mounted on said shell in air tight relation therewith in proximity to said partition and extending into one of said compartments, said valve body having a chamber therein and a pair of ports in communication with said chamber, a first of said ports opening into a first of said compartments and the other of said ports opening into the other of said compartments through said partition whereby to establish communication between said compartments through said chamber, one of said ports having a valve seat, and a pressure responsive valve member in said chamber for cooperation with said seat, said valve member being displaceable from said seat to establish said communication between said compartments and being seatable against said seat to cut off said communication between said compartments.

3. A compressed air tank structure comprising an air tight tank having a shell, a partition in said tank in air tight relation with said shell dividing said tank into first and second, adjacent compartments, a valve having a body mounted on said shell in air tight relation therewith in proximity to said partition and extending into said first compartment, said valve body having a chamber therein and a first port communicating said chamber with said first compartment, said valve body also having a second port communicating said chamber with said second compartment through said partition, said chamber and said ports thus affording communication between said first and second compartments, said first port terminating in a valve seat at said chamber, and a pressure responsive valve member in said chamber for cooperation with said seat, said valve member being displaceable from said seat in response to air pressure in said first compartment which exceeds that in said second compartment to permit flow of compressed air from said first compartment to said second compartment through said ports and said chamber, and said valve member being seatable against said seat in response to air pressure in said second compartment which exceeds that in said first compartment to thereby block return of compressed air from said second compartment to said first compartment.

4. A compressed air tank structure according to claim 3 wherein said first compartment is adapted to store moisture containing air, and wherein said first port extends downwardly into said first compartment whereby moisture collecting therein can drip down into said first compartment for subsequent removal therefrom.

5. A compressed air tank structure according to claim 3 wherein said valve comprises a ball check valve.

6. A compressed air tank structure according to claim 5 wherein the ball has a compressible sheath thereover whereby it can be seated firmly against said seat.

7. A compressed air tank structure comprising an air tight tank having a shell, a partition in said tank in air tight relation with said shell dividing said tank into first and second, adjacent compartments, a valve having a body mounted on said shell in air tight relation therewith in proximity to said partition and extending into said first compartment, said valve body having a chamber therein and a first port communicating said chamber with said first compartment, said valve body also having a second port communicating said chamber with said second compartment through said partition, said chamber and said ports thus affording communication between said first and second compartments, said second port terminating in a valve seat at said chamber, and a pressure responsive valve member in said chamber for cooperation with said seat, said valve member being displaceable from said seat in response to air pressure in said second compartment which exceeds that in said first compartment to permit flow of compressed air from said second compartment to said first compartment through said ports and said chamber, and said valve member being seatable against said seat in response to air pressure in said first compartment which exceeds that in said second compartment to thereby block return of compressed air from said first compartment to said second compartment.

8. A compressed air tank structure according to claim 7 wherein said second compartment is adapted to store moisture containing air, and wherein said second port has a portion which is inclined downwardly in a direction from said first compartment to said second compartment whereby moisture collecting therein can drip down along said portion into said second compartment for subsequent removal therefrom.

9. A compressed air tank structure according to claim 7 wherein said valve comprises a ball check valve.

10. A compressed air tank structure according to claim 9 wherein the ball has a compressible sheath thereover whereby it can be seated firmly against said seat.

11. A compressed air tank structure comprising an air tight tank having a shell, a partition in said tank in air tight relation with said shell dividing said tank into first and second, adjacent compartments, a valve having a body mounted on said shell in air tight relation therewith in proximity to said partition and extending into said first compartment, said valve body having a chamber therein open at one end to said first compartment, a tubular member in said first compartment extending from a point in proximity to said chamber open end downwardly in said first compartment and through said partition into said second compartment to provide communication between said compartments, said tubular member having a valve seat at its end adjacent to said chamber, and a valve member at least partially within said chamber seatable against said seat to close off communication between said compartments, said body, said tubular member and said valve member being so constructed and arranged that the valve member is confined for movement between the body chamber and the valve seat.

12. A compressed air tank structure according to claim 11 wherein said second compartment is adapted to store moisture-containing air therein, wherein said tubular member is inclined downwardly through said partition in a direction from said first compartment to said second compartment whereby moisture collecting therein can drip back down into said second compartment for subsequent removal therefrom, and wherein said valve member and seat comprise a ball type check valve the ball of which has a compressible sheath thereover whereby it can be seated firmly against said seat in response to air pressure in said first compartment which is in excess of that in said second compartment.

References Cited by the Examiner

UNITED STATES PATENTS

| | | | |
|---|---|---|---|
| 802,913 | 10/1905 | Chapsal. | |
| 2,171,266 | 8/1939 | Cissell | 137—576 X |
| 2,268,086 | 12/1941 | Sanford | 137—204 |
| 2,652,849 | 9/1953 | Ebbs | 137—533.11 X |

ISADOR WEIL, *Primary Examiner.*

M. CARY NELSON, *Examiner.*